(12) United States Patent
Beselt (10) Patent No.: US 8,564,851 B2
(45) Date of Patent: Oct. 22, 2013

(54) SCANNER BELT LOAD AND STRETCH COMPENSATION CONTROL SYSTEM

(75) Inventor: Ron Beselt, Burnaby (CA)

(73) Assignee: Honeywell ASCa Inc., Mississauga (CA)

( * ) Notice: Subject to any disclaimer, the term of this patent is extended or adjusted under 35 U.S.C. 154(b) by 146 days.

(21) Appl. No.: 13/281,120

(22) Filed: Oct. 25, 2011

(65) Prior Publication Data

US 2013/0100503 A1 Apr. 25, 2013

(51) Int. Cl.
*H04N 1/04* (2006.01)
(52) U.S. Cl.
USPC ........... 358/474; 358/497; 358/486; 356/328; 162/263; 104/95; 702/117
(58) Field of Classification Search
USPC .......... 358/474, 486, 497, 496, 475; 356/328, 356/429; 162/263, 198, 193, 302; 324/229, 324/226; 104/95, 89; 702/117, 500
See application file for complete search history.

(56) References Cited

U.S. PATENT DOCUMENTS

| | | | |
|---|---|---|---|
| 4,595,384 A | | 6/1986 | Tertinek |
| 4,980,844 A | | 12/1990 | Demjanenko |
| 5,166,748 A | * | 11/1992 | Dahlquist ................... 356/451 |
| 5,270,738 A | * | 12/1993 | Takahashi et al. ............. 347/24 |
| 5,602,757 A | | 2/1997 | Haseley |
| 5,654,799 A | * | 8/1997 | Chase et al. .................. 356/600 |
| 5,714,763 A | * | 2/1998 | Chase et al. ............... 250/559.3 |
| 5,770,129 A | | 6/1998 | Monti |
| 5,773,714 A | * | 6/1998 | Shead ............................ 73/105 |
| 5,793,486 A | * | 8/1998 | Gordon et al. ................ 356/328 |
| 6,075,624 A | * | 6/2000 | Bannai et al. ................. 358/498 |
| 6,213,580 B1 | | 4/2001 | Segerstrom et al. |
| 6,281,679 B1 | * | 8/2001 | King et al. .................... 324/229 |
| 6,289,735 B1 | | 9/2001 | Dister |
| 6,517,439 B1 | | 2/2003 | Sears |
| 6,836,344 B2 | * | 12/2004 | Koide et al. ................... 358/1.9 |
| 7,142,334 B1 | * | 11/2006 | Zechleitner ................... 358/474 |
| 7,202,983 B2 | * | 4/2007 | Yokota et al. ................. 358/496 |
| 7,301,680 B1 | * | 11/2007 | Jones ............................ 358/496 |
| 7,345,797 B2 | * | 3/2008 | Jones ............................ 358/496 |

(Continued)

FOREIGN PATENT DOCUMENTS

GB 2 435 239 A 2/2006
GB 2 480 376 A 11/2011

OTHER PUBLICATIONS

PCT International Search Report and Written Opinion PCT CA 2012/000989 Jan. 16, 2013.

*Primary Examiner* — Negussie Worku
(74) *Attorney, Agent, or Firm* — Cascio Schmoyer & Zervas (57) ABSTRACT

Upper to lower assembly analog position sensors in a dual scanning system measure alignment offsets. A controller uses error signals from the position sensors to calculate actuator error profiles that are used in the next scan in the same direction, with different error profiles being used for forward and reverse scans. Since the alignment error profiles are repeatable for a given set of scanner conditions, the actuator controller anticipates what the error signal will be before each scanning assembly reaches a given position. An optimized error correction can be calculated based on the error profiles and actuator bandwidth without concerns regarding feedback loop speed, overshoot, and unstable control oscillations. An actuation system driven from error profiles can correct for alignment offsets by actively changing belt tensions at the offsetting drive pulleys and/or changing the position of sensor assemblies relative to the drive belt systems.

20 Claims, 6 Drawing Sheets

(56) References Cited

U.S. PATENT DOCUMENTS

| | | |
|---|---|---|
| 7,394,385 B2 | 7/2008 | Franco, Jr. |
| 7,487,401 B2 | 2/2009 | Urmanov |
| 7,494,567 B2 * | 2/2009 | Haran .......................... 162/263 |
| 7,527,351 B2 * | 5/2009 | Hirano et al. ................... 347/42 |
| 7,548,274 B2 * | 6/2009 | Chaleff et al. ................. 348/376 |
| 7,599,427 B2 | 10/2009 | Bik |
| 7,789,348 B2 | 9/2010 | Ruggiero |
| 7,819,009 B2 | 10/2010 | Borah |
| 7,944,582 B2 | 5/2011 | Kato |
| 8,040,567 B2 * | 10/2011 | Hosaka et al. ............... 358/3.06 |
| 8,175,478 B2 * | 5/2012 | Okumura et al. ................ 399/66 |
| 8,218,196 B2 * | 7/2012 | Fujiwara et al. ................ 358/1.9 |

\* cited by examiner

SCANNER BELT LOAD AND STRETCH COMPENSATION CONTROL SYSTEM

FIELD OF THE INVENTION

The present invention generally relates to scanner measurement systems for determining parameters of continuous sheet materials during production and, more particularly, to techniques for maintaining the alignment of dual scanner assemblies to achieve accurate measurement profiles.

BACKGROUND OF THE INVENTION

Various sensor systems have been developed for detecting sheet properties "on-line," i.e., on a sheet-making machine while it is operating. Sensors for continuous flat sheet production processes typically employ single or dual-sided packages with on-line sensors that traverse or scan traveling webs of sheet material during manufacture. With dual scanners, the heads or assemblies are fixed to beams of a scanner frame system that span both sides of the sheet with linear guidance tracks to allow the sensors to move in unison in the cross direction, i.e., in the direction perpendicular to the direction of sheet-travel. Depending upon the sheet-making operation, cross-directional distances can range up to about twelve meters or more. In the paper making art, for instance, the on-line sensors detect variables such as basis weight, moisture content, and caliper of sheets during manufacture. Process scanning systems rely on alignment of upper and lower sensor assemblies to achieve accurate measurement profiles. There is a need for an effective system for monitoring the upper to lower head alignment. Controlling alignment is especially critical at high scan speeds where increased acceleration load is placed on the drive systems that would otherwise increase alignment errors to unacceptable levels.

SUMMARY OF THE INVENTION

The movement of the upper and lower sensor head assemblies for a dual scanning system is typically driven independently by separate belt systems that are connected to a common drive shaft system. If both belt systems are equally tensioned and the mass and friction from both sensor head assemblies are equivalent then both upper and lower assemblies will move across the sheet in a synchronized manner, maintaining opposing positions. However, differences in mass, friction, and/or belt tension will manifest as an upper and lower sensor head assemblies lead/lag offset which can cause errors in sensor readings. The magnitude of the lead/lag offset or misalignment can also vary across the width of the scan. For example, under acceleration a higher mass assembly will cause more stretch in one belt than to the other, whereas during the constant speed phase of a traverse, the loading becomes more even and the lead/lag error will be reduced.

With the present invention, upper to lower assembly analog position sensors are installed in the dual scanning system to measure alignment offsets. Signals from these sensors serve as effective error signals in a control system. The invention is based in part on the recognition that alignment error profiles are repeatable for a given set of scanner conditions thereby allowing the actuator controller to anticipate or predict what the error signal will be before the each scanning assembly reaches a given position. This allows for an optimized error correction to be calculated based on the error profile and actuator bandwidth without concerns regarding feedback loop speed, overshoot, and unstable control oscillations. An actuation system driven by the error profile can correct for alignment offsets by (i) actively changing belt tension such as by offsetting the drive pulleys of upper and lower belts system or (ii) maneuvering the position of sensor head assemblies relative to the drive belt systems. The latter procedure does not affect belt tension but requires a different actuator mechanism that moves one or both sensor head assemblies.

In operation, as the dual sensor heads scan back and forth along the cross or scan direction, error signals obtained from head-to-head position sensors are fed to a controller that calculates an actuator error profile that is used in the next scan in the same direction. (Different error profiles are preferably used for forward and reverse scans.) The actuator system could include a linear screw actuator that is attached to one of the belt tensioners for tension control. These tension actuators are preferably positioned at the 180 degrees turn around pulley located at the end of the support beams. Due to the relatively slow nature of the error profile, a screw-type actuator would be sufficient to correct for most of the error profiles. Additional benefits would be to implement automated belt tension adjustment and a safe lock-in-place failure mode. Alternatively, to maneuver one or both sensor head assemblies, a linear actuator such as a screw or voice coil system could be inserted between the coupling, which connects a head sensor assembly the corresponding belt system. These head-movement actuators are preferably positioned at the connection between the belt and carriage for direct position control.

Accordingly, in one aspect, the invention is directed to a system for controlling the movement of a scanning system having dual mounting heads that define a measurement gap adapted to accommodate a continuous web that has a first side and a second side and that travels in a downstream direction, which includes:

(a) a first elongated member that extends along a first direction wherein the first elongated member supports a first mobile mounting head that is disposed adjacent to a first side of the web, the first mounting head including a first operative surface facing the first side of the web;

(b) means for driving the first mobile mounting head;

(c) a second elongated member that extends along a second direction that is parallel to the first direction wherein the second elongated member supports a second mobile mounting head that is disposed adjacent to a second side of the web, the second mounting head including a second operative surface facing the second side of the web, wherein the first operative surface and the second operative surface define the measurement gap through which the continuous web travels, and wherein the measurement gap has a web entry end and a web exit end that is downstream from the web entry end, and wherein movement of the first mobile carriage is synchronized with movement of the second mobile mounting head;

(d) means for driving the second mobile mounting head;

(e) an alignment error generating means for generating error signals representing the difference in alignment between the first and second mobile heads as the first and second mobile heads scan back and forth along a translation axis; and (f) actuator means for regulating the relative position of the first mobile mounting head and/or the second mobile mounting head, wherein the actuator means is controlled by the error signals.

In another aspect, the invention is directed to a system for monitoring a scanning system that detects characteristics of a sheet of material during linear translation along a translation axis of a bi-directionally driven mobile detector device, the system that includes:

(a) the scanning system being monitored which includes:
 (i) a first elongated member that extends along a first direction wherein the first elongated member supports a first carriage on which a first sensor head is mounted;
 (ii) a second elongated member that extends along a second direction that is parallel to the first direction wherein the second elongated member supports a second carriage on which a second sensor head is mounted; and
 (iii) a common drive mechanism that moves the first carriage along a main scanning direction and the second carriage along a second direction that is parallel to the first direction, wherein the first sensor head and second sensor head moves in a synchronized fashion, and wherein the common drive mechanism includes a first pulley assembly that guides a first belt that is coupled to the first carriage and a second pulley assembly that guides a second belt that is coupled to the second carriage;
(b) an alignment sensor configured to continuously measure offset between the first sensor head and the second sensor head as the mobile detector device is translated back and forth along the translation axis and to generate misalignment error signals in relation to the position of the moving mobile detector device and its direction of movement;
(c) actuator means for manipulating the common drive mechanism to alter the tension in the first belt and/or-second belt or for regulating the relative position of the first sensor head to the second sensor head;
(d) computing means in communication with the alignment sensor to process the misalignment error signals to generate alignment correction profiles and storing the alignment correction profiles; and
(e) control means in communication with the computing means for correcting misalignments offsets by actuating the actuator means to maintain the misalignment error within a specified level.

In a further aspect, the invention is directed to a method of controlling the synchronized movement of dual scanner heads in a scanning system that detects characteristics of a sheet of material during linear translation along a translation axis of a bi-directionally driven mobile detector device, wherein the scanning system includes (i) a first elongated member that extends alone: a first direction wherein the first elongated member supports a first carriage on which a first sensor head is mounted, wherein the first mounting head including a first operative surface facing a first side of the web; (ii) a second elongated member that extends along a second direction that is parallel to the first direction wherein the second elongated member supports a second carriage on which a second sensor head is mounted, wherein the second mounting head including a second operative surface facing a second side of the web and wherein the first operative surface and the second operative surface define the measurement gap through which the continuous web travels; and (iii) a common drive mechanism that moves the first carriage along a main scanning direction and the second carriage along a second direction that is parallel to the first direction, wherein the first sensor head and second sensor head moves in a synchronized fashion, and wherein the common drive mechanism includes a first pulley assembly that guides a first belt that is coupled to the first carriage and a second pulley assembly that guides a second belt that is coupled to the second carriage; said method includes the steps of:

(a) measuring the misalignment between the first sensor head and the second sensor head as the mobile detector device is translated back and forth along the translation axis;

(b) generating misalignment error signals in relation to the position of the moving mobile detector device and its direction of movement; and (c) correcting misalignment offsets by actuating one or more actuators to maintain the misalignment error within a specified level.

DESCRIPTION OF PREFERRED EMBODIMENTS

Figure 1A:
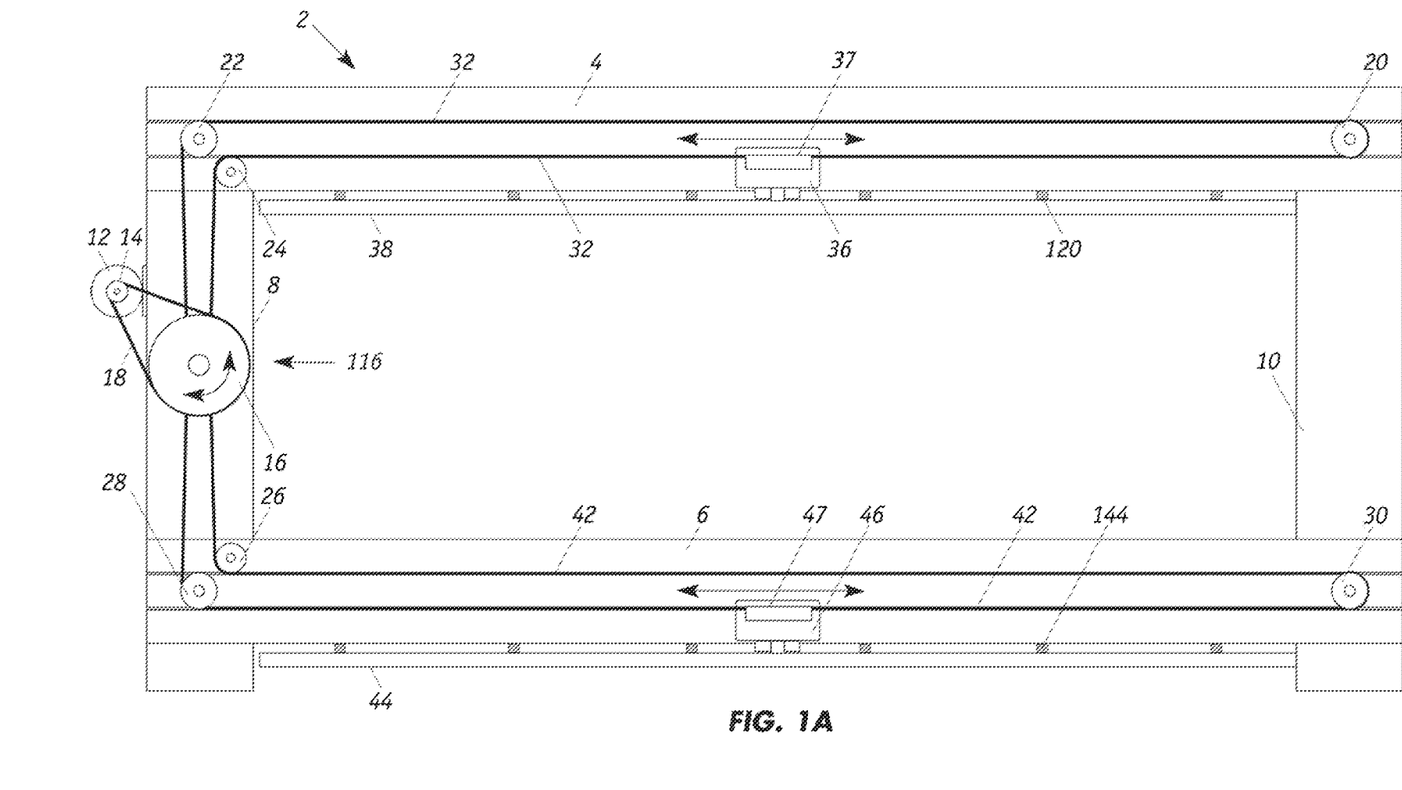
FIG. 1A illustrates a dual scanner system with parallel upper and lower support beams and drive mechanism.
Figure 2:
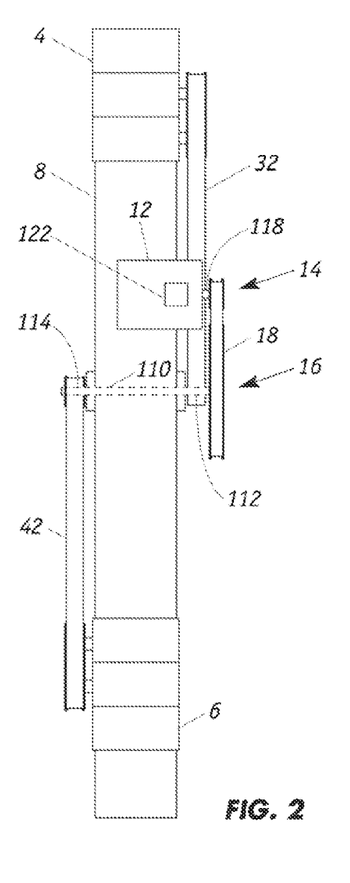
FIG. 2 is a side view of the scanner system depicting the motor of the drive mechanism.

FIGS. 1A and 2 show a scanner frame system 2 that has upper and lower support beams 4, 6 that are mounted onto a pair of upright end members 8, 10. Associated upper and lower suspended tracks 38 and 44 are secured to the lower surfaces of upper and lower support beams 4 and 6, respectively. In particular, a series of upper individual vertical support structures 120 supports upper track 38 and a series of lower individual vertical support structures 144 supports lower track 44. As described further herein, each track defines a path along which a sensor-mounted roller carriage travels.

Upper support beam 4 is equipped with a plurality of upper fixed turning pulleys 20, 22 and 24 that are secured to the beam with pins. Each of the upper fixed turning pulleys preferably has a groove around its outer perimeter that is dimensioned to accommodate a flexible belt or cable 32 which is wound around the upper fixed turning pulleys and the proximal end 112 of drive shaft 110. Flexible cable 32 is connected to coupling device 36 that is attached an upper roller carriage (not shown.) Flexible cable 32 is secured with sufficient tension to avoid excessive slack and remains taut as it moves back and forth along the main scanning direction between end members 8, 10.

Similarly, lower support beam 6 is equipped with a plurality of lower fixed turning pulleys 26, 28 and 30 that are secured to the beam with pins. Each of the lower fixed turning pulleys has a groove around its outer perimeter that is dimensioned to accommodate a flexible belt or cable 42 which is wound around the lower fixed turning pulleys and the distal end 114 of drive shaft 110. Flexible cable 42 is connected to coupling device 46 that is attached a lower roller carriage (not shown.).

Figure 1B:
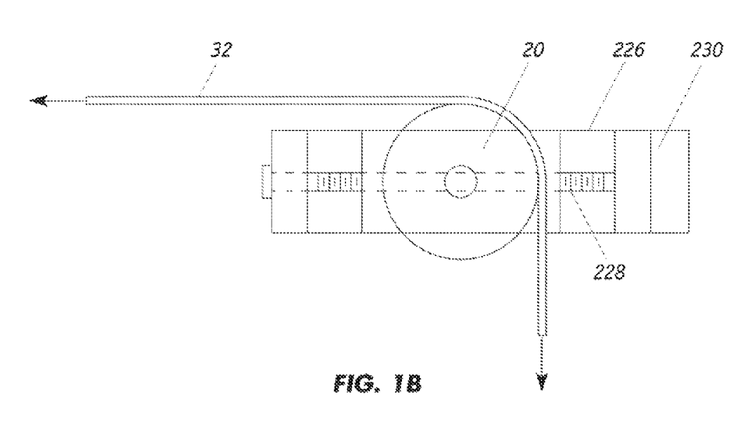
FIGS. 1B and 1C are side and top views showing a pulley mounted on a linear actuator.
Figure 1C:
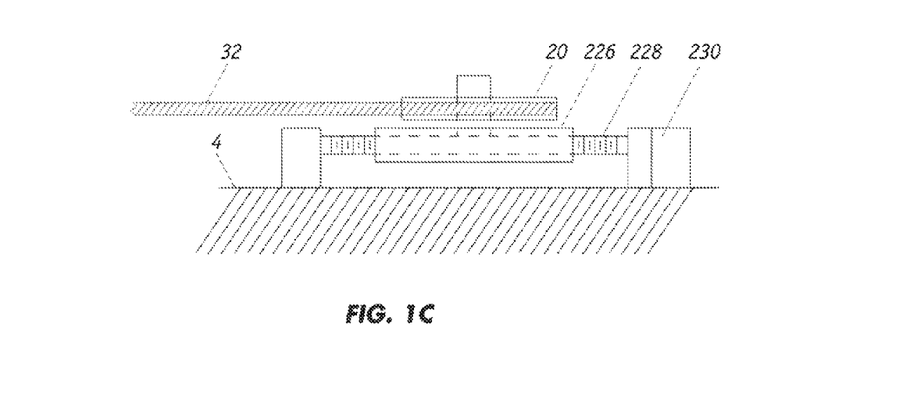
Figure 1D:
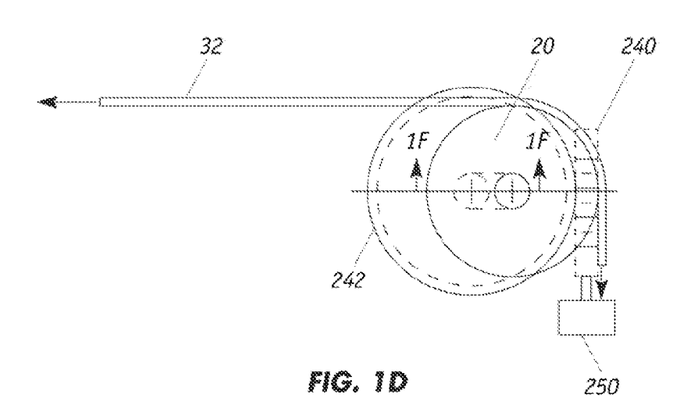
FIGS. 1D and 1E are side and top views showing a pulley mounted on eccentric centers.
Figure 1E:
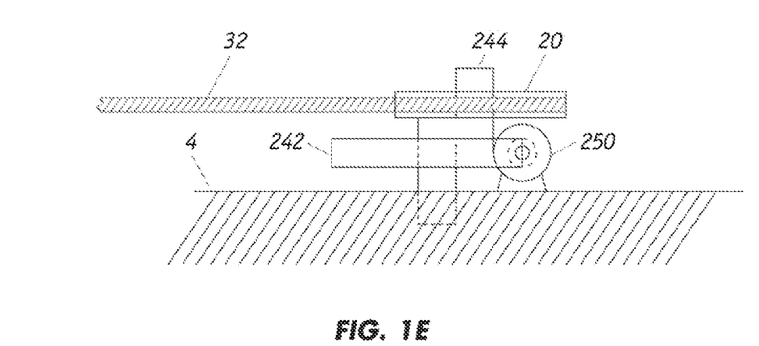
Figure 1F:
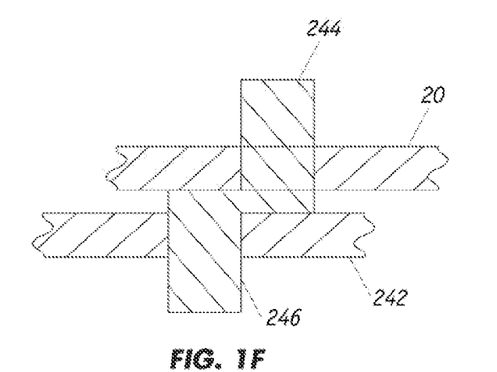
FIG. 1F is a cross sectional view taken alone line 1F-1F in FIG. 1D.

Linear actuators may be positioned to control belt tension, which indirectly affects head-to-head position, at one or both of the upper and lower turn around pulleys 20, 30. Linear actuators could be added equally to one or more of the turning pulleys 22, 24, 26 and/or 28. FIGS. 1B and 1C, illustrates a linear actuator 226, with lead screw 228 and motor 230, that is coupled to pulley 20, which is frictionally connected to flexible cable or timing belt 32. The linear actuator is secured to upper support beam 4. An alternative connection configuration is shown in FIGS. 1E, 1F, and 1G where pulley 20 is mounted on an eccentric center that allows for rotational adjustment that generates linear motion. In particular, an eccentric center apparatus having ends 244 and 246 is employed with end 246 being rotatably attached to upper support beam 4 and coupled to a worm drive that includes a worm gear 242, worm 240 and motor 250. End 244 is coupled to pulley 20 around which timing belt 32 is secured. Activating motor 240 causes the axis of the pulley to rotate about the axis of end 246 thereby causing pulley 20 to move with a component of displacement in the lateral direction, thus controlling belt tension.

Alternatively, as shown in FIG. 1A, more direct head-to-head alignment positioning could be achieved by adding screw or voice coil actuators 37 and 47 to one or both of coupling devices 36 and 46, respectively. Activating head-moving actuators 37 and 47 maneuvers coupling devices 35 and 36, respectively, in order to align them.

As further illustrated in FIGS. 1A and 2, common drive mechanism 116 for the roller carriages (not shown) includes a reversible electric motor 12 that is mounted on end member 8 and has a driven shaft 118 extending therefrom which rotates driven pulley 14. A gear belt 18 is looped over driven pulley 14 and drive or idler pulley 16; the center of idler pulley 16 is connected to drive shaft 110. Flexible cable 42 is looped over lower fixed turning pulley 28 and the distal end 114 of drive shaft 110 while flexible cable 32 is looped over upper fixed pulley 22 and the proximal end 112 of drive shaft 110. The diameters of the proximal and distal ends 112 and 114 of drive shaft 110 are the same so that the engagement of flexible cables 32, 42 to the ends 112, 114 enables motor 12 to generate the same amount of torque that is applied to each flexible cable. In this fashion, with the dual arrangement of the upper and lower fixed turning pulleys and their associated flexible belts, activation of motor 12 simultaneously engages both coupling devices 36 and 46. A rotary encoder 122 is mounted adjacent to motor 12 for motion feedback in tracking the position of motor shaft 118. In addition, the encoder is used to synchronize operations of the motor components. The configurations and dimensions for the upper and lower fixed turning pulleys are preferably the same so that coupling devices 36 and 46 move back and forth along parallel paths at the same speed and direction.

The constant and cyclic movement of the common drive mechanism translates the dual sensor heads back and forth along cross direction as a web of material is being monitored. The drive mechanism can be a source of misalignment. For example, drive pulley eccentricity can cause periodic acceleration with the frequency being related to the pulley diameter and scanning speed. In addition, drive bearing or belt malfunctions generate high frequency vibrations that are transmitted via the drive belts to the scanner heads.

Figure 3:
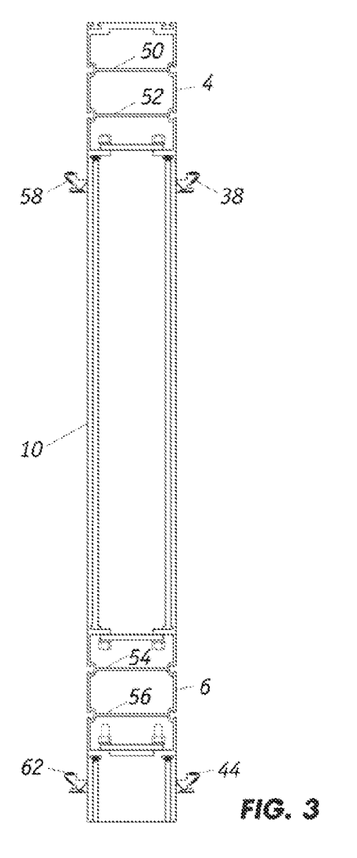
FIG. 3 is a cross sectional view of the upper and lower support beams.

Referring to FIG. 3, upper and lower structural support beams 4, 6 are mounted to a vertical end member 10 that is typically secured with bolts to a factory floor. Each single monolithic beam, with its hollow cross section, is preferably manufactured from extruded aluminum. In upper support beam 4, web members 50, 52 add structural integrity and provide lateral support during the extrusion manufacturing process by keeping the sides of the beam from deforming. Similarly, lower beam structure 6 includes interior web members 54, 56. The lengths of support beams 4, 6 typically range from 6 to 14 meters and more. Support beams 4, 6 are subject to fluctuations in environmental conditions with attendant temperature changes. The resulting thermal distortion of the beams, among other things, causes the radiation source and detector in dual scanner head systems, which are described further herein, to be misaligned. Resonant vibrations can occur in either upper or lower support beam.

Figure 4:
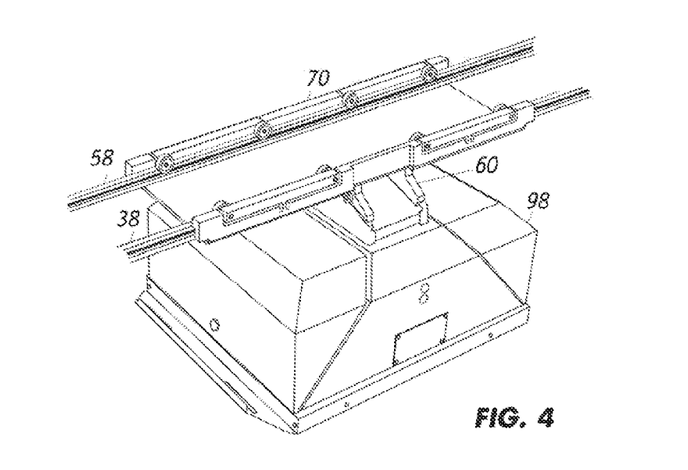
FIG. 4 shows a roller carriage positioned on a set of tracks and from which a sensor head is suspended.

The roller carriage used in the scanner system is particularly suited for transporting articles along a suspended track system, that is, one that is positioned above the ground. In this fashion, the roller carriage can transport a detection device traveling over a sheet or other material being monitored. As shown in FIG. 3, upper tracks 38, 58 and lower tracks 44, 62 define fixed paths for dual carriages (not shown). FIG. 4 depicts a set of suspended tracks 38, 58 dimensioned to accommodate the wheels of a roller carriage 70 that is transporting a sensor head 98 that is attached to the underside of the carriage via support assembly 60. Tracks 38, 58 define a fixed path in the main scanner direction through which carriage 70 transports the suspended sensor head 98.

Figure 5:
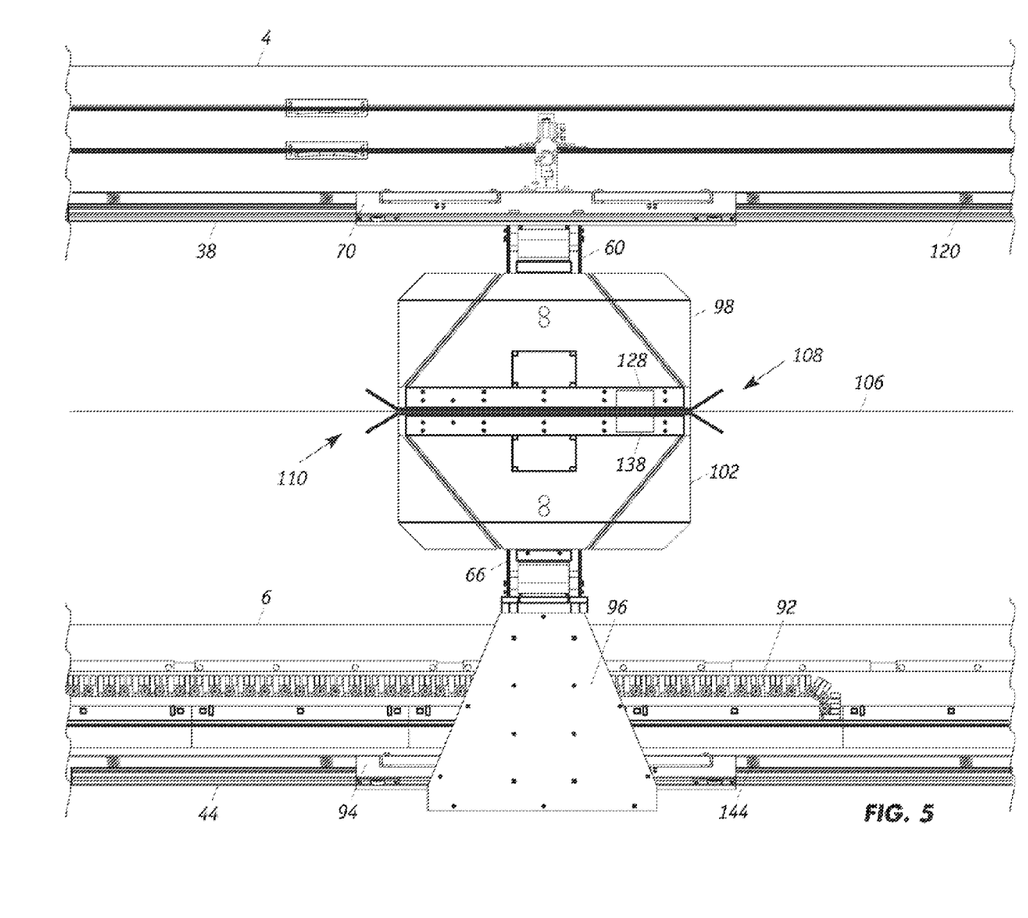
FIG. 5 is a side view of a dual scanning system consisting of two roller carriages each supporting one of the dual sensor heads.

FIG. 5 shows a scanning mechanism with scanner sensor heads 98 and 102. This dual sensor configuration is typically employed when the sensor is operating in the transmission mode. For example, upper sensor head 98 may house a source of infrared radiation while the lower sensor head 102 houses an infrared detector that measures the radiation that is transmitted through the material being monitored. The upper scanner head 98 is supported by an upper support beam 4, that has a lower surface to which a series of laterally spaced apart rigid support structures 120 is mounted. These vertical structures support track 38. The wheels of roller carriage 70 engage track 38 as the carriage advances along the cross direction to a moving sheet 106. Similarly, lower scanner head 102 is supported by a lower support beam 6, that has a lower surface on which a plurality of laterally spaced apart, rigid support structures 144 is mounted. These vertical structures support track 44 onto which the wheels of roller carriage 94 are engage. Movement of the roller carriage is facilitated by a drive mechanism similar to that of the upper scanner head. A power chain 92 supplies electricity and electrical signal to lower scanner head 102.

Lower sensor head 102 is secured to support assembly 66 which is mounted onto a member 96 that extends from roller carriage 94 so as to position lower sensor head 102 adjacent to upper scanner head 98. The operative faces of the lower and upper scanner heads 102, 98 define a gap with an entry 108 and exit 110 through which a web of material 106, that is moving in the machine direction, passes. An analog position sensor measures the x-direction (left/right) offset of the upper and lower sensor heads 98 and 102. A preferred position sensor which determines this x or scan direction misalignment, which is along the belt or cross direction axis, is a magnetic sensor comprising an Hall Effect device 128 that is mounted in upper head 98 and a reference bar magnet 138 that is mounted in lower head 138, and is aligned to lie directly across from first Hall Effect device 128. The sensitive direction of the Hall Effect device 128 is precisely oriented such that it is sensitive only to the x-component of the magnetic field at its location. As upper head 92 moves relative to lower head 102, the magnetic field moves relative to the sensor and a signal change is measured which is calibrated to a distance measurement. Hall Effect devices are described, for example, in U.S. Pat. No. 6,281,679 to King et al., which is incorporated herein. Optical alignment determining measurement devices, that include a radiation and imaging source and a corresponding optical position sensitive detector are described, for example, in U.S. Pat. No. 5,714,763 to Chase et al., which is incorporated herein by reference.

There are three main sources of mechanical belt errors associated with dual scanning mechanisms that cause substantial misalignment of the upper and lower sensor heads. The first is belt tooth backlash where differences in the belt stretch, which is related to tension, manifests as a constant error offset between profiles of two different directions. The second is belt tooth pitch variations, which are caused by manufacturing defects, and appears as peaks and valleys in the error profile with wavelengths typically 0.5 m to 2 m in length. Finally, variations in the masses carried on the upper and lower head assembles result is differences in the friction drag and inertial forces between the upper and lower drive systems. This belt stretch difference characteristic appears as general slope to the error profile as error accumulates when the scanner heads travel from one end of the scanner to the other. Of the three contributors, the first factor causes belt stretch that changes over time with changes in operating temperature and component age. Linear actuators coupled to one or more of the pulleys 20, 30 (FIG. 1A) can alter or control belt tension and thus compensate for belt tension changes over time and control short-term head position errors with the same actuator. In contrast, the screw actuators 37, 47 (FIG. 1A) do not change belt tension but is able to move one of the heads relative to its drive belt and therefore relative to the other head.

The movements of the dual scanner heads 102, 98 are synchronized with respect to speed and direction so that they are aligned with each other. Scanning systems having sensor components on opposite sides of the sheet being analyzed are described, for example, in U.S. Pat. No. 5,773,714 to Shead and U.S. Pat. No. 5,166,748 to Dahlquist, which are incorporated herein by reference.

Scanner heads 98, 102 serve as platforms for carrying sensors to detect sheet properties, such as basis weight, in the case of paper. For example, lower scanner head 102 may carry a radiation source, such as a nuclear beta radiation source, and upper scanner head 98 may carry a detector. In this case, the sensors can be employed to make basis weight measurements by measuring the radiation intensity incident on the detector when a sheet is present as compared to the beta radiation that is incident upon the detector, when no sheet is present; that is, the basis weight is measured by the beta radiation attenuated by the sheet material.

Alternatively, to measure the moisture content of paper, an infrared radiation source can be positioned in the lower scanner head 102 and the radiation that is transmitted through the paper is captured by a detector that is located in the upper scanner head 98. Analysis of the transmitted radiation yields the moisture content. Exemplary scanning dual head sensors employing radiation source and detectors are described, for example, in U.S. Pat. No. 5,654,799 to Chase et al., U.S. Pat. No. 5,793,486 to Gordon et al., and U.S. Pat. No. 7,494,567 to Haran, which are incorporated herein by reference. While the sensor is illustrated in measuring characteristics of paper, it is understood that the sensor can be employed to detect a variety of components in a number of different materials including, for example, plastics, coated materials, fabrics, and the like.

In operation during scanning of the dual sensor head from one end of the scanner to the other, which corresponds approximately from one edge of the moving web to the other, each sensor head decelerates as it approaches the end and come to a complete stop before it accelerates in the reverse direction to a certain speed, decelerated at the other end and so forth. The position error sensors 128, 138 (FIG. 5) are mounted to the heads and have the same velocity profile as the heads, accelerate to scan speed, approach the opposite end of scanner and decelerate to full stop. The data from the sensors is plotted relative to position of the scanner head along the x or scan axis and not to relative to time. Therefore, given a constant data acquisition rate of 1 khz, for instance, there is more data collected at the slow moving tails of each scan as opposed to the faster full speed middle positions.

A technique of implementing the scan belt load and stretch compensation process of the present invention is to employ a control system to receive offset readings from the position error sensors 128, 138 (FIG. 5) during each scan and if there is offset, then (i) tension actuators and/or on either or both pulley tensioning assemblies 20, 30 (FIG. 1A) or (ii) head-moving actuators 37, 47 (FIG. 1A) can be activated to reduce or eliminate misalignment.

The readings from the sensors are processed to convert them into useable signals for the tensioning actuator(s) at the turnaround pulley or coupling actuator(s) mounted to the head. Preferably, a low pass filter system is employed so that frequency signals are not sent to the actuators that are outside of their response ranges and so that the maximum to minimum ranges are not exceeded. In addition, multi-scan averages may be useful in reducing responses to transients. The error condition is then sent through a gain setting to allow it to be scaled appropriately to actuator input range. Under certain circumstances the belt correction may exceed the range of the actuator. At that point alarm conditions may be set indicating that a manual tension adjustment may be required by the technician to reduce the baseline error in the system.

Figure 6:
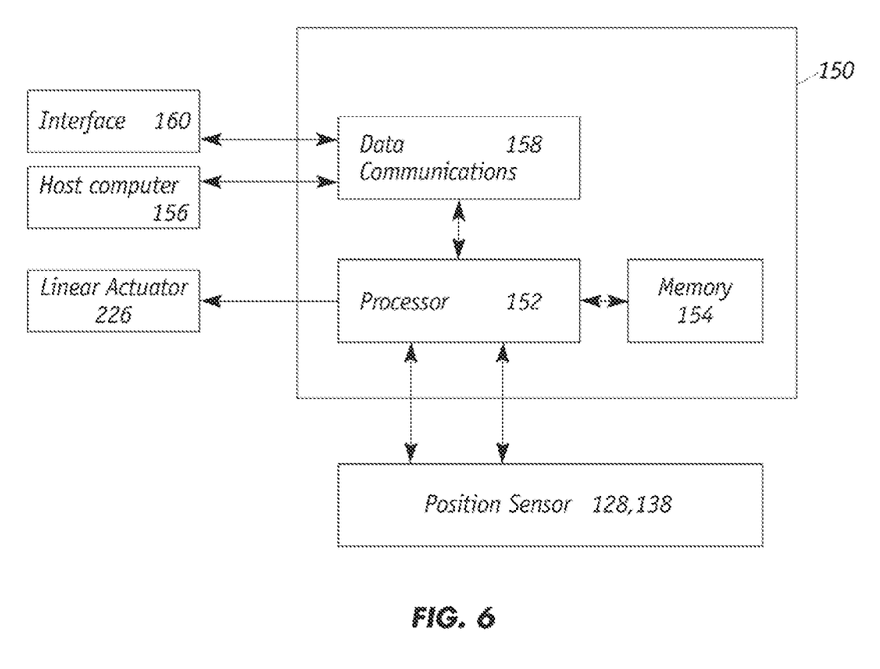
FIG. 6 is a block diagram of a control system for producing an optimized error correction and an actuator interface for producing signals operating various actuators in response to the optimized error correction.

FIG. 6 depicts operations of the position sensor having Hall Effect device 128 and corresponding magnet 138 that are located in the scanner head 98 and 102, respectively, (FIG. 5). Diagnostic module 150 includes a processor 152 that is programmed to control and operate the various components in diagnostic module 150. A memory 154 stores the error profile. Data communication system 158 interfaces processor 152 with interface device 160 and host computer 156. Processor 152 controls linear actuator(s) 236.

During operations of a scanner system, the position sensor 128, 138 measures the scan direction offsets at each position along the scanner length (or the error profile) for both the forward and reverse motions are measured. Error profile signals are recorded in memory 154. Since the errors are substantially repeatable, they can be used as signals in a feed forward loop for the next scan in the same direction rather than reacting to the signals in real time as they come from the position sensor. In this regard, processor 152 accesses memory 154 to anticipate the offset and to activate linear actuator(s) 236 accordingly. Command and parameter information are communicated via data communication system 158.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that workers may make variations in those embodiments skilled in the art without departing from the scope of the present invention as defined by the following claims.

What is claimed is:

1. A scanning system having dual mounting heads that define a measurement gap, which has a web entry end and a web exit end that is downstream from the web entry end, and which is configured to accommodate a continuous web that has a first side and a second side and that travels in a downstream direction, which comprises:
- (a) a first elongated member that extends along a first direction wherein the first elongated member supports a first mobile mounting head that is disposed adjacent to the first side of the web, the first mobile mounting head including a first operative surface facing the first side of the web;
- (b) means for driving the first mobile mounting head;
- (c) a second elongated member that extends along a second direction that is parallel to the first direction wherein the second elongated member supports a second mobile mounting head that is disposed adjacent to the second side of the web, the second mobile mounting head including a second operative surface facing the second side of the web, wherein the first operative surface and the second operative surface define the measurement gap through which the continuous web travels;
- (d) means for driving the second mobile mounting head such that movement of the first mobile mounting head is synchronized with movement of the second mobile mounting head;
- (e) an alignment error generating means for generating error signals representing a difference in alignment between the first and second mobile mounting heads as the first and second mobile mounting heads scan back and forth along a translation axis; and
- (f) actuator means for regulating relative positions of the first mobile mounting head and/or the second mobile mounting head, wherein the actuator means is controlled by the error signals.

2. The scanning system of claim 1 wherein the means for driving the first mobile mounting head includes a first belt system, wherein the means for driving the second mobile mounting head includes a second belt system and wherein the actuator means for regulating relative positions adjusts tension in the first belt system and/or tension in the second belt system.

3. The scanning system of claim 2 wherein the actuator means for regulating relative positions comprises one or more belt tension actuators that are coupled to the first belt system, the second belt system or to both belt systems and that adjusts tension in either or both the first and second belt systems.

4. The scanning system of claim 3 wherein the one or more belt tension actuators comprise one or more linear actuators.

5. The scanning system of claim 1 wherein the actuator means for regulating relative positions comprises one or more head-movement actuators that maneuvers the first mobile mounting head, the second mobile mounting head, or both the first and second mobile mounting heads.

6. The scanning system of claim 5 wherein the one or more head-movement actuators comprise a first linear actuator that is operatively connected to the first mobile mounting head and/or a second linear actuator that is operatively connected to the second mobile mounting head.

7. The scanning system of claim 1 wherein the alignment error generating means comprises an alignment sensor that determines misalignment between the first mobile mounting head and the second mobile mounting head.

8. The scanning system of claim 1 comprising a common drive mechanism that is coupled to both the first and the second mobile mounting heads.

9. The scanning system of claim 1 wherein the first mobile mounting head is secured on a first carriage that is supported on the first elongated member and the second mobile mounting head is secured on a second carriage that is supported on the second elongated member.

10. A scanning system, that detects characteristics of a sheet of material during linear translation along a translation axis of a bi-directionally driven mobile detector device, and that comprises:
- (a) a scanning apparatus which comprises:
  - (i) a first elongated member that extends along a first direction wherein the first elongated member supports a first carriage on which a first sensor head is mounted;
  - (ii) a second elongated member that extends along a second direction that is parallel to the first direction wherein the second elongated member supports a second carriage on which a second sensor head is mounted; and
  - (iii) a common drive mechanism that moves the first carriage along a main scanning direction and moves the second carriage along a second direction that is parallel to the first direction, wherein the first sensor head and second sensor head move in a synchronized fashion, and wherein the common drive mechanism includes a first pulley assembly that guides a first belt that is coupled to the first carriage and a second pulley assembly that guides a second belt that is coupled to the second carriage;
- (b) an alignment sensor configured to continuously measure offset between the first sensor head and the second sensor head as the mobile detector device is translated back and forth along the translation axis and to generate misalignment error signals in relation to a position of the mobile detector device and its direction of movement;
- (c) actuator means for manipulating the common drive mechanism to alter tension in the first belt and/or second belt or for regulating relative positions of the first sensor head to the second sensor head;
- (d) computing means in communication with the alignment sensor to process the misalignment error signals to generate alignment correction profiles and storing the alignment correction profiles; and
- (e) control means in communication with the computing means for correcting misalignment offsets by actuating the actuator means to maintain the offset between the first sensor head and the second sensor head within a specified level.

11. The scanning system of claim 10 wherein the actuator means for manipulating the common drive mechanism adjusts the tension in the first belt system and/or tension in the second belt system.

12. The scanning system of claim 10 wherein the actuator means for manipulating the common drive mechanism comprises one or more belt tension actuators that are coupled to the first pulley assembly, the second pulley assembly or to both the first and second pulley assemblies and that adjusts tension in either or both the first and second pulley assemblies.

13. The scanning system of claim 12 wherein the one or more tension actuators comprise one or more linear actuators.

14. The scanning system of claim 10 wherein the actuator means for manipulating the common drive mechanism comprises one or more head-movement actuators that maneuvers the first sensor head, the second sensor head, or both the first and second sensor heads.

15. A method of controlling the synchronized movement of dual scanner heads in a scanning system that detects characteristics of a sheet of material during linear translation along a translation axis of a bi-directionally driven mobile detector device, wherein the scanning system includes (i) a first elongated member that extends along a first direction wherein the first elongated member supports a first carriage on which a first sensor head is mounted, wherein the first mounting head including a first operative surface facing a first side of a continuous web; (ii) a second elongated member that extends along a second direction that is parallel to the first direction wherein the second elongated member supports a second carriage on which a second sensor head is mounted, wherein the second mounting head including a second operative surface facing a second side of the web and wherein the first operative surface and the second operative surface define the measurement gap through which the continuous web travels; and (iii) a common drive mechanism that moves the first carriage along a main scanning direction and moves the second carriage along a second direction that is parallel to the first direction, wherein the first sensor head and second sensor head moves in a synchronized fashion, and wherein the common drive mechanism includes a first pulley assembly that guides a first belt that is coupled to the first carriage and a second pulley assembly that guides a second belt that is coupled to the second carriage; said method comprising the steps of:

(a) measuring misalignment between the first sensor head and the second sensor head as the mobile detector device is translated back and forth along the translation axis;

(b) generating misalignment error signals in relation to positions of the mobile detector device and its direction of movement; and (c) correcting misalignment offsets by actuating one or more actuators to maintain the misalignment within a specified level.

16. The method of claim 15 further comprising the step of:

(d) recording the misalignment error signals as a function of direction and position of the mobile detector device and wherein step (c) comprises using the recorded misalignment error signals to regulate relative positions of the first and second mounting heads.

17. The method of claim 16 wherein step (c) comprises using the recorded misalignment error signals measured at a location along the translation axis to regulate the relative positions of the first and second mounting heads at the same location in subsequent movements of the first and second carriages along the main scanning direction.

18. The method of claim 15 wherein step (c) comprises activating one or more actuators to adjust tension in the first pulley assembly and/or the second pulley assembly.

19. The method of claim 15 wherein the one or more actuators comprise one or more linear actuators.

20. The method of claim 15 wherein step (c) comprises activating one or more actuators to maneuver the first sensor head and/or the second sensor head in a translation axis direction.

* * * * *